(12) United States Patent
Takahashi et al.

(10) Patent No.: US 9,004,583 B2
(45) Date of Patent: Apr. 14, 2015

(54) STRUCTURE FOR FRONT PORTION OF VEHICLE AND METHOD FOR MANUFACTURING VEHICLE (75) Inventors: Koji Takahashi, Wako (JP); Masaharu Endou, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/239,950

(22) PCT Filed: Aug. 8, 2012

(86) PCT No.: PCT/JP2012/070139
§ 371 (c)(1),
(2), (4) Date: Feb. 20, 2014

(87) PCT Pub. No.: WO2013/027576
PCT Pub. Date: Feb. 28, 2013

(65) Prior Publication Data
US 2014/0183884 A1 Jul. 3, 2014

(30) Foreign Application Priority Data
Aug. 24, 2011 (JP) ................................. 2011-182631

(51) Int. Cl.
*B60R 19/48* (2006.01)
*B60R 19/03* (2006.01)
*B60R 13/10* (2006.01)
*B60D 1/60* (2006.01)
*B60R 19/50* (2006.01)
*B60R 19/52* (2006.01)

(52) U.S. Cl.
CPC ................. *B60R 19/48* (2013.01); *B60R 13/10* (2013.01); *B60R 19/50* (2013.01); *B60R 19/52* (2013.01); *B60D 1/60* (2013.01)

(58) Field of Classification Search
USPC .......................................... 293/117, 120–122
See application file for complete search history.

(56) References Cited

FOREIGN PATENT DOCUMENTS

| DE | 10250289 | * | 2/2004 |
| JP | 2001-294105 | | 10/2001 |
| JP | 2004-175190 | | 6/2004 |
| JP | 2006-188082 | | 7/2006 |
| JP | 2007-186026 | | 7/2007 |
| KR | 20020045097 | * | 6/2002 |

* cited by examiner

*Primary Examiner* — Dennis H Pedder
(74) *Attorney, Agent, or Firm* — Rankin, Hill & Clark LLP (57) ABSTRACT A vehicle front structure includes: a bumper face disposed at a vehicle front end; and a lower grill disposed at a bumper opening section of the bumper face. The bumper face includes: a hook cover (20), after formed integrally with the bumper face within the bumper opening section, separated from the bumper face; and a hook cover holding mechanism (26) formed within the bumper opening section integrally with the bumper face to detachably fix the hook cover (20). The hook cover (20) includes: a cover body section (40) for closing a hook cover attachment portion in the bumper face; and a cover snap-fit claw (32) for snap-fitting onto a bumper engaging portion in the hook cover attachment portion. The hook cover holding mechanism (26) includes a hold latch nail (34) for engaging with the cover snap-fit claw (32) by resilient deformation of the hook cover (20).

10 Claims, 11 Drawing Sheets

FIG.11B

STRUCTURE FOR FRONT PORTION OF VEHICLE AND METHOD FOR MANUFACTURING VEHICLE

TECHNICAL FIELD

The present invention relates to a structure for a front portion of a vehicle (vehicle front structure) including a hook cover for opening and closing a hook hole formed in a bumper, and a method for manufacturing a vehicle.

BACKGROUND ART

From the perspective of aesthetic design, passenger vehicles are made such that a hook hole formed in a front bumper is unable to be seen on its exterior, for example, by closing it with a hook cover. This hook hole is adapted to be penetrated by a hook for towing a vehicle, for example, in the time of vehicle malfunctions, car accidents and so forth.

With regard to a hook cover structure of this kind, Patent Document 1 discloses a bumper structure in which a bumper is molded integrally with a cover body that has the same shape as the hook cover for opening and closing the hook hole, and wherein the cover body is detachably fixed with a coated or non-coated portion of the bumper to form a single element.

PRIOR TECHNICAL DOCUMENT

Patent Document

[Patent Document 1] Japanese Patent Application Laid-Open Publication No. 2007-186026

SUMMARY OF THE INVENTION

Technical Problem

However, in the bumper structure disclosed in Patent Document 1, there is a problem that, if the hook cover is fixed integrally with the bumper and coated simultaneously with the bumper, the hook cover vibrates to cause mottle or too-thin coating through which an underlying base color is observable. To prevent such mottle and too-thin coating, tools for holding the hook cover must be prepared for respective shapes of bumper faces, which makes things complicated and increases manufacturing cost.

In addition, in the bumper structure disclosed in Patent Document 1, if the hook cover is installed on the vehicle integrally with the bumper, another work tool becomes necessary to attach the hook cover to the hook hole, which makes the attaching work complicated. Conversely, if the hook cover and the bumper are molded integrally and then separated from each other in manufacturing process, there is a problem that each circulates in the market through a different distribution route, which causes an increased packaging cost and an increased transportation cost.

A general object of the present invention is to provide a vehicle front structure and a vehicle manufacturing method that are capable of preventing the mottle and the too-thin coating from occurring. Moreover, a general object of the present invention is to provide a vehicle front structure and a vehicle manufacturing method that are capable of reducing the manufacturing cost.

Solution to Problem

To achieve the object, the present invention is a structure for a front portion of a vehicle, comprising: a bumper face disposed at a front end of the vehicle; and a bumper component disposed at a bumper opening section of the bumper face, wherein the bumper face comprises: a hook cover, after formed integrally with the bumper face within the bumper opening section, separated from the bumper face; and a hook cover holding mechanism formed within the bumper opening section integrally with the bumper face to detachably support and fix the hook cover, wherein the hook cover comprises: a cover body section for closing a hook cover attachment portion disposed in the bumper face; and a cover snap-fit claw for snap-fitting onto a bumper engaging portion disposed in the hook cover attachment portion, wherein the hook cover holding mechanism comprises a hold latch nail for engaging with and supporting the cover snap-fit claw by resilient deformation of the hook cover.

According to the present invention, the bumper face, the hook cover and the hook cover holding mechanism are formed integrally, and thereafter the hook cover is separated from the bumper face, in order for the resilient deformation of the hook cover to cause the cover snap-fit claw to engage with and support the hold latch nail. In this way, in the present invention, while the bumper face and the hook cover are coated simultaneously, the hook cover holding mechanism suppresses vibration and displacement of the hook cover so as to perform a function as a tool for support and fixation. As a result, in the present invention, the mottle and the too-thin coating are prevented from occurring.

In addition, according to the present invention, the separation of the hook cover from the bumper face enables them to be managed as separate components, and both the bumper face and the hook cover are not always necessary to manufacture in the manufacturing of maintenance components, which results in reduced manufacturing cost.

Further, according to the present invention, since the hook cover is transported and washed with high pressure in a state supported and fixed by the hook cover holding mechanism, the hook cover is prevented from disengaging from the bumper face by a wind pressure of passing wind during transportation or a water pressure of washing liquid.

Furthermore, according to the present invention, since the bumper face and the hook cover are transported in a state assembled integrally by the hook cover holding mechanism, the packaging cost and the transportation cost are cut back to reduce the manufacturing cost.

In addition, the present invention is preferably structured such that the hook cover further comprising: a cover shaft section extending outward from the cover body section; and a cover resilient portion disposed between the cover body section and the cover shaft section, wherein the hook cover holding mechanism further comprises: a first hold opening section for receiving the cover shaft section inserted therein when supporting and fixing the hook cover; and a second hold opening section for receiving the cover snap-fit claw inserted therein, the second hold opening section including the hold latch nail.

According to the present invention, the cover shaft section of the hook cover is separated from the bumper face and inserted into the first hold opening section in order to securely engage and support the cover snap-fit claw with the hold latch nail by resilient deformation of the cover resilient portion.

Further, the present invention is structured such that the hook cover holding mechanism further comprises: a hold leg portion disposed at the first hold opening section on left and right sides thereof, and connected to a periphery of the bumper opening section; and a hold manipulation portion extending from a vicinity of the second hold opening section toward a middle of the bumper opening section, wherein the hold manipulation portion is pushed inwardly of the bumper face to disengage the cover snap-fit claw.

According to the present invention, the hold leg portion latches the cover shaft section of the hook cover to securely hold the hook cover. By this, the hook cover is preferably prevented from disengagement by the vibration and displacement of the hook cover at the time of coating, by the wind pressure during transportation or by the water pressure during high pressure washing. In addition, according to the present invention, by pushing the hold manipulation portion inwardly of the bumper face, the engagement between the cover snap-fit claw and the hold latch nail is readily released, so that another tool is unnecessary for detaching the hook cover from the hook cover holding mechanism so as to improve the workability therein.

Furthermore, the present invention is preferably structured such that the hold leg portion comprises: a cover holding nail disposed on an outside with respect to the bumper face; and a hold reinforcement portion disposed on an inside with respect to the bumper face.

According to the present invention, by providing the cover holding nail and the hold reinforcement portion, the function for supporting and fixing the cover shaft section of the hook cover is enhanced enough to obtain a stably supporting and fixing state.

Furthermore, the present invention is preferably structured such that the bumper component comprises: a license plate mounting portion for mounting a license plate; and a license plate opening section formed in the license plate mounting portion, wherein the hook cover holding mechanism is arranged within the license plate opening section.

According to the present invention, attaching work is conducted after the bumper face is attached at the front end of the vehicle and before the license plate is attached on the license plate mounting portion. In this case, since the hook cover holding mechanism is arranged within the license plate opening section which is visible from the outside of the vehicle, the hook cover is readily detachable from the hook cover holding mechanism without detaching the bumper face or the bumper component and, what is more, without using another tool or the like.

Furthermore, the present invention is preferably structured such that the cover shaft section comprises cover restriction portions extending outwardly from middles of left and right sides of the cover shaft section toward the cover body section, wherein the hook cover attachment portion comprises a cover insertion opening, formed at an outer end of the bumper face, for receiving the cover shaft section inserted therein, wherein the cover restriction portion resiliently deforms toward the cover shaft section during insertion of the cover shaft section into the cover insertion opening, and the cover restriction portion resiliently supports the bumper face on a back side thereof at the time when the hook cover is opened outwardly of the vehicle.

According to the present invention, the cover shaft section of the hook cover is provided with the cover restriction portion, which resiliently supports the back side of the bumper face at the time when the hook cover is opened from the hook cover attachment portion outwardly of the vehicle. As a result, in the present invention, the hook cover is prevented from dropping off the bumper face even in use of tow hook not shown. Also, the exterior surface of the bumper face is avoided from being damaged even when the hook cover is pivoted to open.

Furthermore, the present invention is a method for manufacturing a vehicle comprising the aforementioned structure for the front portion of the vehicle, comprising the steps of forming integrally the bumper face, the hook cover and the hook cover holding mechanism;

separating the hook cover from the bumper face;

inserting the cover shaft section of the hook cover into the first hold opening section, and fixing by engagement the cover snap-fit claw onto the hold latch nail;

pushing the hold manipulation portion inwardly of the bumper face to disengage the cover snap-fit claw, and pulling out the hook cover upwardly from the first hold opening section; and attaching the hook cover onto the hook cover attachment portion.

According to the present invention, the bumper face, the hook cover and the hook cover holding mechanism are formed integrally, and thereafter the hook cover is separated from the bumper face, and the cover shaft section of the hook cover is inserted in the first hold opening section, and the cover snap-fit claw is fixed by engagement with the hold latch nail. In this way, when the bumper face and the hook cover are coated simultaneously, the vibration and displacement of the hook cover are suppressed to preferably prevent the mottle and the too-thin coating from occurring. In addition, such a manufacturing method makes it unnecessary to prepare tools for respective shapes of the bumper face, and thereby the manufacturing cost is reduced.

Also, according to the present invention, the vehicle body is usually equipped with an eyebolt for towing the vehicle, and a dealer attaches the hook cover upon detaching the eyebolt. In this case, the present invention enables an easy attachment of the hook cover to the hook cover attachment portion without using another tool.

Further, according to the present invention, even after the hook cover is separated from the bumper face in the manufacturing process, the separated hook cover is put in market in a state fixed to and supported by the hook cover holding mechanism, and thereby the packaging cost and the transporting cost are reduced.

Advantageous Effects of Invention

The present invention provides a vehicle front structure and a vehicle manufacturing method that are capable of preventing the mottle and the too-thin coating from occurring, and capable of reducing the manufacturing cost.

DETAILED DESCRIPTION OF THE INVENTION

Figure 1:
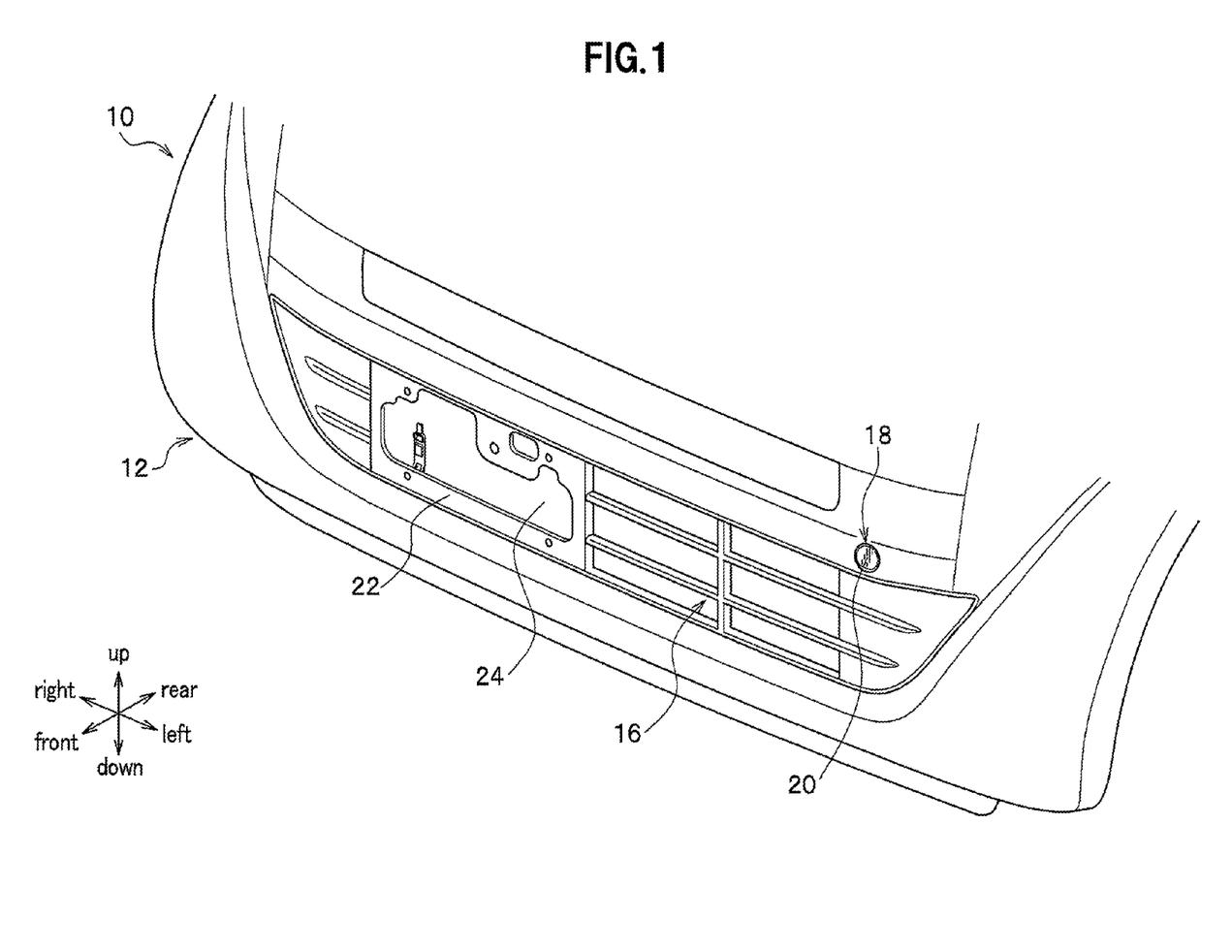
FIG. 1 is a perspective view illustrating a front portion of a vehicle, to which the vehicle front structure according to an embodiment of the present invention is applied.

Next, the detail of an embodiment of the present invention will be described with reference to the drawings when needed. FIG. 1 is a perspective view illustrating a front portion of a vehicle, to which the vehicle front structure according to an embodiment of the present invention is applied. It is noted that "front rear" and "up down" shown with arrows in each drawing indicate a front-rear direction and a up-down direction of a vehicle body respectively, and "left right" indicates a left-right direction as seen from a driver's seat.

As shown in FIG. 1, a vehicle 10, as a completed product, includes: a bumper face 12 disposed at a front end thereof; a lower grill (bumper component) 16 which is fitted in a bumper opening section 14 (refer to FIGS. 2A and 2B) of the bumper face 12; and a hook cover 20 attached to a hook cover attachment portion 18 arranged at an outer end of the bumper face 12. It is noted that FIG. 1 is omitting a depiction of a license plate to be fixed on the lower grill 16.

The lower grill 16 has: a license plate mounting portion 22 on which a license plate, not shown, is attached; and a license plate opening section 24 formed in the license plate mounting portion 22.

Figure 2A:
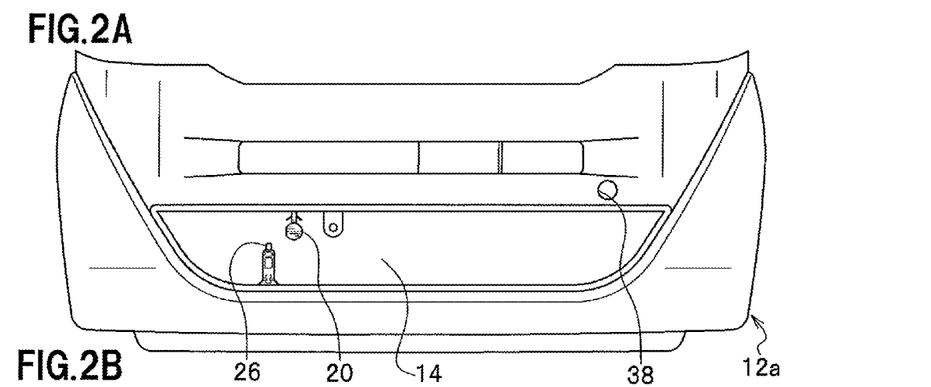
FIGS. 2A-2C are front views illustrating a manufacturing process of a bumper face.
Figure 2B:
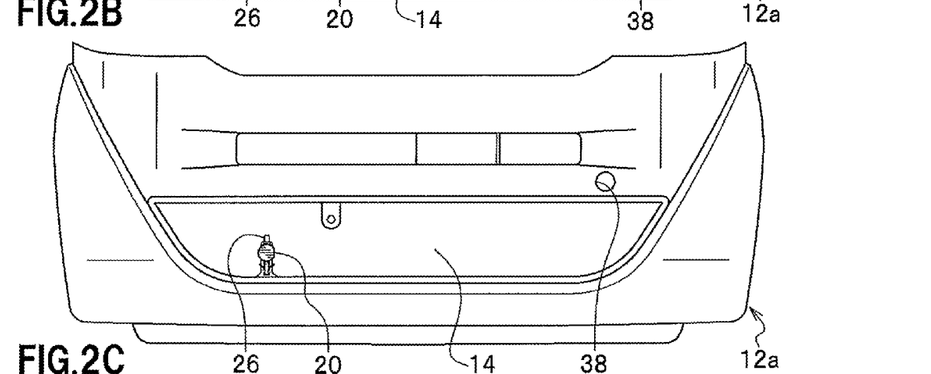
Figure 2C:
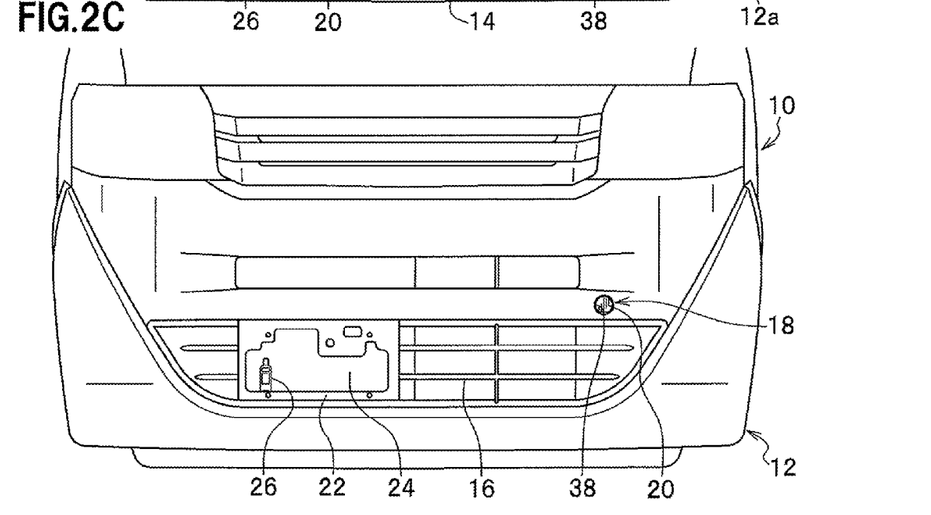

FIG. 2 are front views illustrating a manufacturing process of the bumper face. FIG. 2A is a front view of an injection-molded body in which the bumper face is molded integrally with the hook cover by injection molding. FIG. 2B is a front view illustrating a state where the hook cover is supported by and fixed on the hook cover holding mechanism at the time of coating or transportation of the bumper face. FIG. 2C is a front view illustrating a front portion of the assembled vehicle in which the hook cover is attached to the hook cover attachment portion.

The manufacturing process of the bumper face 12 will be described schematically with reference to FIGS. 2A-2C.

As shown in FIG. 2A, an injection-molded body 12a, as taken out of a die not shown, includes the hook cover 20, the hook cover holding mechanism 26 for holding the hook cover 20, and the bumper face 12, all of which are molded integrally with one another, for example, of a plastic material. In the injection-molded body 12a, the hook cover 20 is arranged on the side of an upper portion of the bumper opening section 14, and the hook cover holding mechanism 26 is arranged on a lower portion of the bumper opening section 14.

Figure 5A:
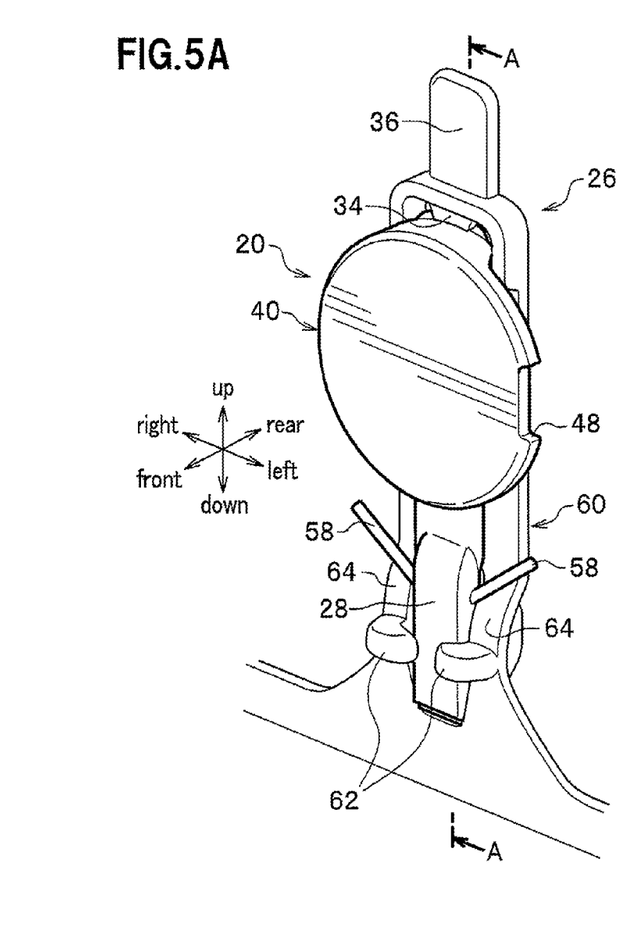
FIG. 5A is an enlarged perspective view illustrating a state where the hook cover is supported by and fixed on the hook cover holding mechanism.
Figure 5B:
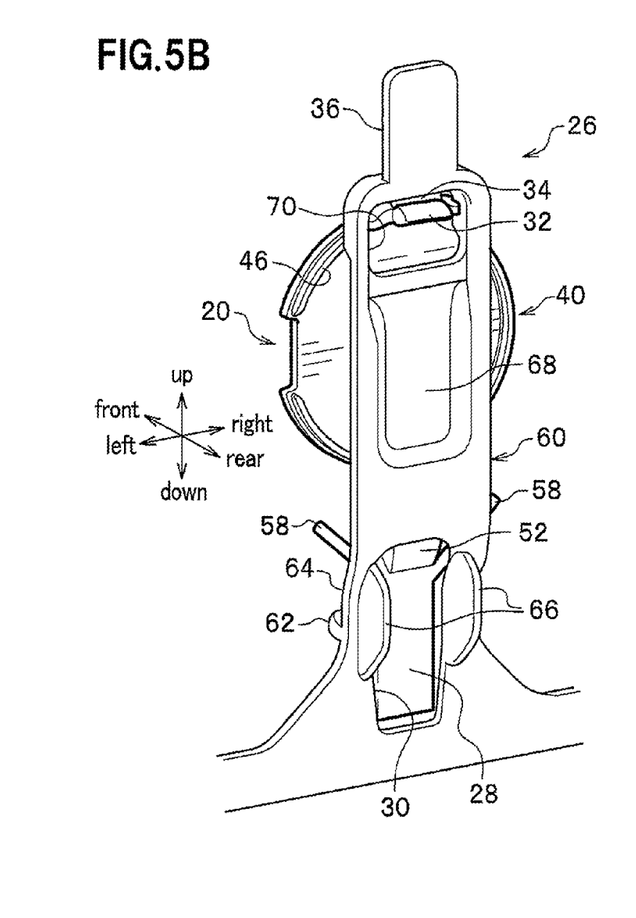
FIG. 5B is an enlarged perspective view of the supported and fixed state as seen from rearward.

Subsequently, as shown in FIG. 2B, the hook cover 20 is separated from a periphery of the bumper opening section 14, and the separated hook cover 20 is fixed on the hook cover holding mechanism 26 so as to be supported thereby. In other words, as shown in FIGS. 5A and 5B described below, a cover shaft section 28 of the hook cover 20 is inserted through a first hold opening section 30 of the hook cover holding mechanism 26, and a cover snap-fit claw 32 of the hook cover 20 is fixed by engagement (supported by engagement) with a hold latch nail 34 of the hook cover holding mechanism 26, and thereby the hook cover 20 is supported by and fixed on the hook cover holding mechanism 26. A coating process is carried out with regard to both of the bumper face 12 and the hook cover 20 substantially simultaneously, while the hook cover 20 is fixed on and supported by the hook cover holding mechanism 26 (refer to FIG. 6 described below). After the coating process, transportation from a manufacturer to a dealer is conducted with the hook cover 20 kept supported by and fixed on the hook cover holding mechanism 26.

At a dealer, the hook cover 20 is separated away from the hook cover holding mechanism 26. Specifically, as shown in FIG. 7 described below, a hold manipulation portion 36 of the hook cover holding mechanism 26 is pushed inwardly of the bumper face 12 to release the engagement between the cover snap-fit claw 32 and the hold latch nail 34, and the hook cover 20 is pulled out upwardly from the first hold opening section 30, and thereby the hook cover 20 is separated away from the hook cover holding mechanism 26. The separated hook cover 20 is attached to the hook cover attachment portion 18 having a through hole 38 (hook hole) formed therein, in order to produce the assembled vehicle shown in FIG. 2C.

In the above manufacturing method, the bumper face 12, the hook cover 20 and the hook cover holding mechanism 26 are molded integrally by injection molding, and thereafter the hook cover 20 is separated from the bumper face 12, and the cover shaft section 28 of the hook cover 20 is inserted in the first hold opening section 30, and the cover snap-fit claw 32 is fixed by engagement with the hold latch nail 34 (refer to FIG. 5).

In this way, when the bumper face 12 and the hook cover 20 are coated simultaneously, the vibration and displacement of the hook cover 20 are suppressed to preferably prevent the mottle and too-thin coating from occurring. In addition, such a manufacturing method makes it unnecessary to prepare tools for respective shapes of the bumper face 12, and thereby the manufacturing cost is reduced.

Also, the vehicle body is usually equipped with an eyebolt for towing the vehicle, and a dealer attaches the hook cover 20 upon detaching the eyebolt. In this case, the present embodiment, as described below, enables an easy attachment of the hook cover 20 to the hook cover attachment portion 18 without using a tool.

Further, in the present embodiment, even after the hook cover 20 is separated from the bumper face 12 in the manufacturing process, the separated hook cover 20 is put in market in a state supported by and fixed on the hook cover holding mechanism 26, and thereby the packaging cost and the transporting cost are reduced.

Next, the structures of the hook cover 20 and the hook cover holding mechanism 26 will be described below in detail with reference to the injection-molded body 12a shown in FIG. 2A.

Figure 3A:
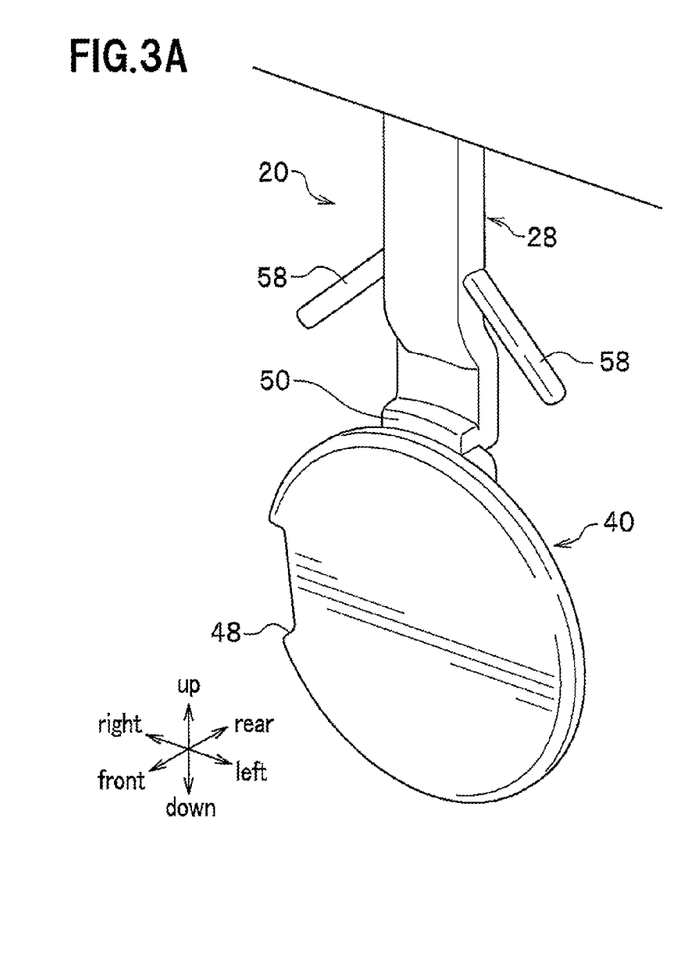
FIG. 3A is an enlarged perspective view of an injection-molded body of a hook cover as seen from frontward.
Figure 3B:
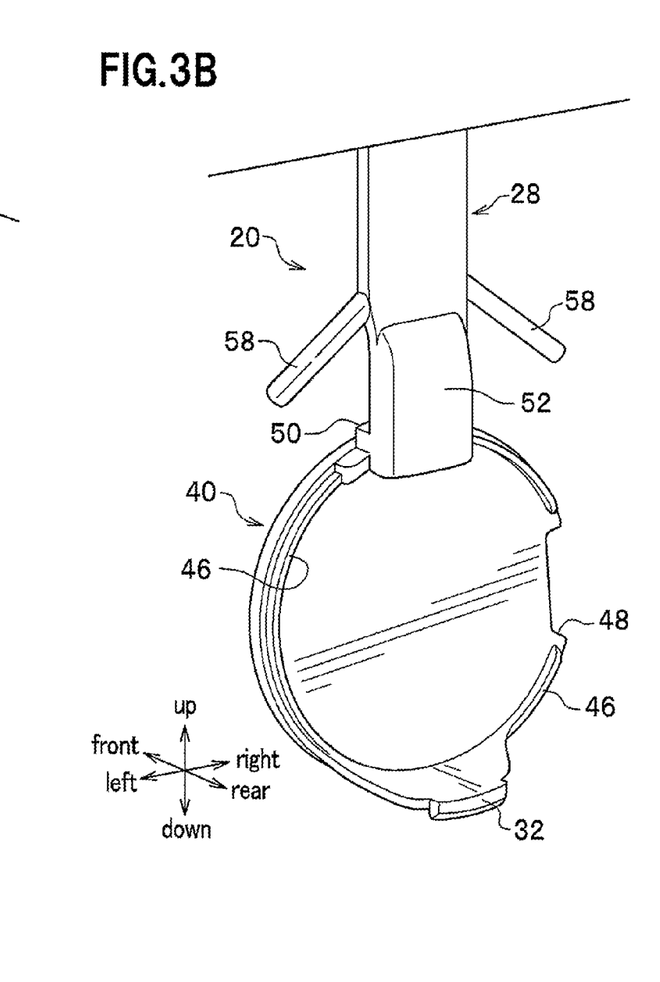
FIG. 3B is an enlarged perspective view of the injection-molded body of the hook cover as seen from rearward.
Figure 4A:
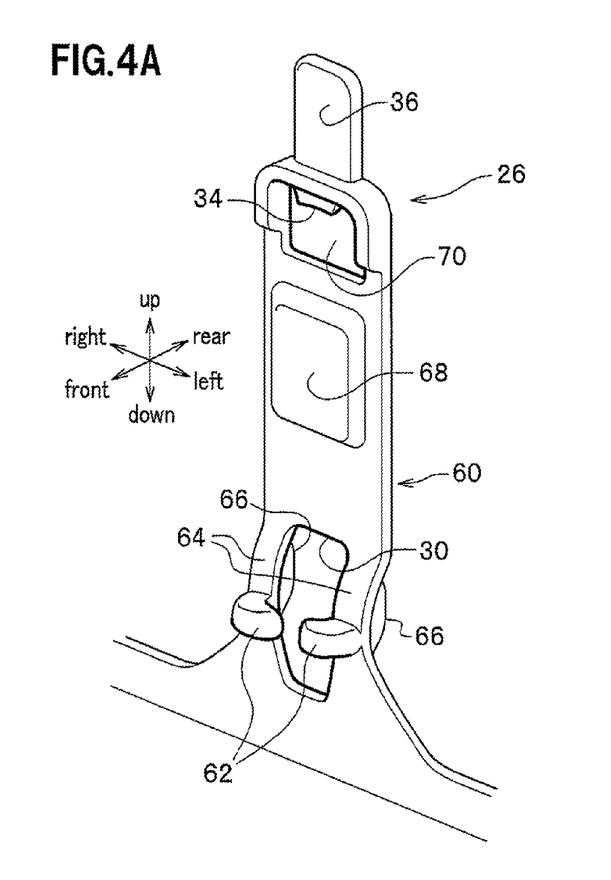
FIG. 4A is an enlarged perspective view of an injection-molded body of a hook cover holding mechanism as seen from frontward.
Figure 4B:
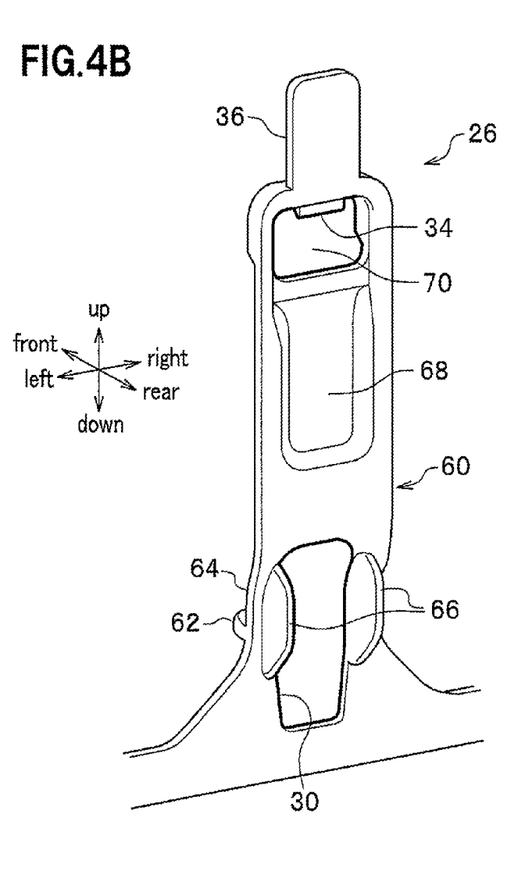
FIG. 4B is an enlarged perspective view of the injection-molded body of the hook cover holding mechanism as seen from rearward.
Figure 6:
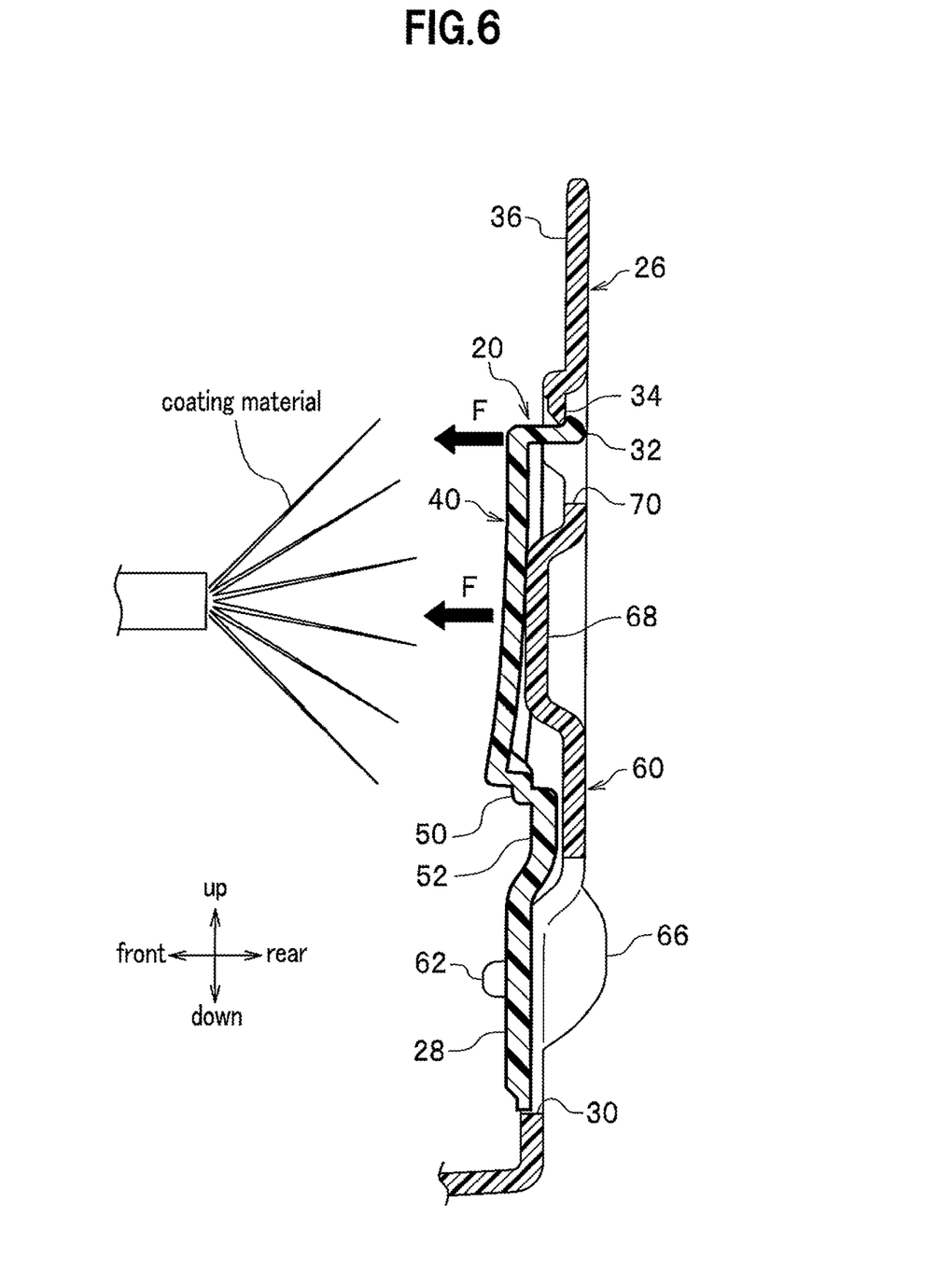
FIG. 6 is an enlarged vertical cross-sectional view taken along line A-A of FIG. 5A.

FIG. 3A is an enlarged perspective view of an injection-molded body of a hook cover as seen from frontward, and FIG. 3B is an enlarged perspective view of the injection-molded body of the hook cover as seen from rearward. FIG. 4A is an enlarged perspective view of an injection-molded body of a hook cover holding mechanism as seen from frontward, and FIG. 4B is an enlarged perspective view of the injection-molded body of the hook cover holding mechanism as seen from rearward. FIG. 5A is an enlarged perspective view illustrating a state where the hook cover is supported by and fixed on the hook cover holding mechanism, and FIG. 5B is an enlarged perspective view of the fixed and supported state as seen from rearward. FIG. 6 is an enlarged vertical cross-sectional view taken along line A-A of FIG. 5A.

As shown in FIGS. 3A and 3B, the hook cover 20 includes: a cover body section 40 formed in a substantially disk shape; and a cover shaft section 28 which is formed integrally with the cover body section 40 so as to extend outward from the cover body section 40. The cover body section 40 includes: a cover snap-fit claw 32 which engages with a bumper engaging portion 44 (refer to FIG. 8C) provided at the hook cover attachment portion 18; a cover step portion 46 which is formed continuously from the cover snap-fit claw 32 so as to extend along the outer periphery of the cover body section 40; and an open recess 48 for inserting a tool when the hook cover 20 fixed on the hook cover attachment portion 18 is pulled out and opened. The cover shaft section 28 is formed in a rod-like shape which is insertable into the first hold opening section 30 of the hook cover holding mechanism 26.

In this case, the cover body section 40 includes the cover snap-fit claw 32, and the cover snap-fit claw 32 engages with each of the bumper engaging portion 44 of the hook cover attachment portion 18 and the hold latch nail 34 of the hook cover holding mechanism 26, and thereby the hook cover 20 is prevented from disengaging at the time when the hook cover attachment portion 18 is closed, or when the hook cover 20 is coated, transported or washed with high pressure. In addition, the cover step portion 46 serves to maintain a certain difference in level between the bumper exterior surface and the cover body section 40, when the through hole 38 (hook hole, refer to FIG. 2C) of the bumper face 12 is closed with the hook cover 20.

Between the cover body section 40 and the cover shaft section 28, a cover support portion 50 and a cover resilient portion 52 are provided. The cover support portion 50 is brought into contact with a bumper step portion 56 formed at a cover insertion opening 54 (refer to FIG. 8A), to serve as a pivot point for supporting the hook cover 20 during opening or closing operation of the hook cover 20. The cover resilient portion 52 causes the cover snap-fit claw 32 to snap fit resiliently at the time when the hook cover attachment portion 18 is closed or when the hook cover 20 is held in place, in order to serve as a support for the cover body section 40.

The cover shaft section 28 is provided with a pair of resilient cover restriction portions 58 which extend outwardly toward the cover body section 40 from the middles of both left and right sides, with diagonally left down inclination and diagonally right down inclination, respectively. The cover restriction portions 58 have resilience. The cover restriction portions 58 is brought into contact with a back portion of the bumper face 12 when the hook cover 20 is opened, and thereby the hook cover 20 is prevented from dropping off the hook cover attachment portion 18.

As shown in FIG. 2C, the hook cover holding mechanism 26 is arranged within the license plate opening section 24. As shown in the injection-molded body 12a of FIG. 2A, the hook cover 20 is integrally molded with the bumper face 12 within the bumper opening section 14, and detachably support and fix the hook cover 20.

As shown in FIGS. 4A and 4B, the hook cover holding mechanism 26 has a hold main body portion 60 of a substantially flat plate-like rectangle body, and is supported by an inner periphery of the bumper opening section 14 in an upwardly protruding manner (refer to FIG. 2). Below the hold main body portion 60, there are provided: a pair of cover holding nails 62 disposed outside the bumper face 12 and arranged continuously from the inner periphery; the first hold opening section 30 of a rectangular shape into which the cover shaft section 28 is inserted at the time when the hook cover 20 is supported and fixed; and a pair of hold leg portions 64 arranged at both left and right sides of the first hold opening section 30 above the pair of the cover holding nails 62 and connected to the periphery of the bumper opening section 14 to support the hold main body portion 60. On the back surface of the pair of the hold leg portions 64, there is provided hold reinforcement portions 66 which bulge inwardly of the bumper face 12 and reinforce the hold leg portions 64.

In the hold main body portion 60, there are provided: a hold bulge portion 68 which bulges toward the front face (frontward); a second hold opening section 70 which surrounds a laterally-long rectangular open space; the hold latch nail 34 which protrudes so as to face the inside of the second hold opening section 70 and deforms resiliently to engage with the cover snap-fit claw 32 for support; and the hold manipulation portion 36 which extends from the proximity of the second hold opening section 70 toward the middle of the bumper opening section 14, so that an operator can push it for operation.

The hold main body portion 60 holds the hook cover 20, which is supported and fixed by the hook cover holding mechanism 26, to prevent it from mottle and too-thin coating caused by vibration, displacement, etc during coating. Also, the hold main body portion 60 exerts an appropriate resilient force for preventing the disengagement of the hook cover 20 from the hook cover holding mechanism 26 during transportation with wind pressure or high pressure washing.

A pair of cover holding nails 62 serve to support and fix the hook cover 20 by clamping the cover shaft section 28 from both left and right side when holding the hook cover 20. Moreover, the first hold opening section 30 allows the cover shaft section 28 to be inserted therein, in order to support the hook cover 20 when holding the hook cover 20. Furthermore, a pair of hold leg portions 64 are arranged at a lower portion of the bumper opening section 14 to support the hold main body portion 60.

The hold reinforcement portions 66 reinforce the hold leg portions 64 so as not to cause mottle and too-thin coating by the vibration and displacement during coating, and so as not to disengage the hook cover 20 during transportation with wind pressure or high pressure washing.

When holding the hook cover 20, the hold bulge portion 68 continuously pushes the hook cover 20 outwardly of the bumper opening section 14 in order to support the hook cover 20 latched by the hold latch nail 34. When holding the hook cover 20, the second hold opening section 70 allows the cover snap-fit claw 32 to be inserted therein, and has the hold latch nail 34 for latching the hook cover 20.

When holding the hook cover 20, the hold latch nail 34 latches the cover snap-fit claw 32 to prevent the disengagement of the hook cover 20 during transportation with wind pressure or high pressure washing. When holding the hook cover 20, the hold manipulation portion 36 is pushed by the operator inwardly of the bumper opening section 14 to disengage the hold latch nail 34 which is latching the cover snap-fit claw 32 (release the engagement with the hold latch nail 34), and thereby the hook cover 20 becomes removable upwardly.

Next, the structure for supporting the hook cover 20 inserted, for support and fixation, in the hook cover holding mechanism 26 will be described with reference to FIG. 6.

First, the cover shaft section 28 of the hook cover 20 is inserted into the first hold opening section 30 of the hook cover holding mechanism 26, and thereby is clamped by the pair of the cover holding nails 62 from both sides so as to create support points between the cover shaft section 28 and the pair of the cover holding nails 62. It is noted that these support points are created by area contact (or point contact) between the inner surfaces of the pair of the cover holding nails 62 and the outer surface of the cover shaft section 28.

Subsequently, in response to a force input by the operator inwardly of the bumper opening section 14, the cover resilient portion 52 exerts an resilient force with a center at the support points in order to generate a reaction force F outwardly of the bumper opening section 14. Upon contacting the hold bulge portion 68, the hook cover 20 abates the force input by the operator onto the cover body section 40, and the cover snap-fit claw 32 engages with the hold latch nail 34.

Lastly, under the reaction force F, the cover snap-fit claw 32 is pushed against the hold latch nail 34 so that the hook cover 20 is supported and fixed by the hook cover holding mechanism 26.

FIGS. 7A-7D are perspective views illustrating a state where the hook cover is being held by and to be disengaged from the hook cover holding mechanism. A disengaging structure for disengaging (separating) the supported and fixed hook cover 20 from the hook cover holding mechanism 26 will be described with reference to FIGS. 7A-7D.

Figure 7A:
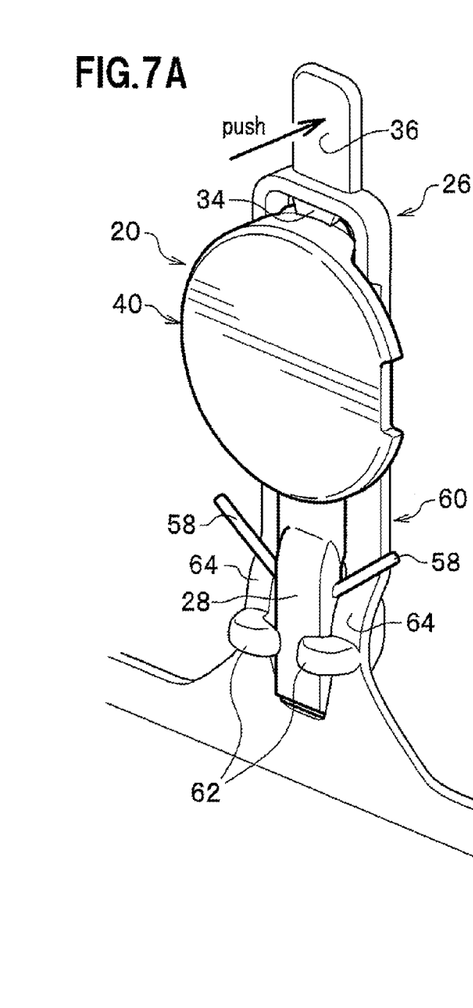
FIGS. 7A-7D are perspective views illustrating a state where the hook cover held by the hook cover holding mechanism is to be disengaged therefrom.

As the operator pushes the hold manipulation portion 36 inwardly of the bumper opening section 14 (arrow direction), the hold main body portion 60 and the hold leg portions 64 deform resiliently, and this resilient deformation causes the hook cover holding mechanism 26 as a whole to incline slightly rearward (refer to FIG. 7A).

Figure 7B:
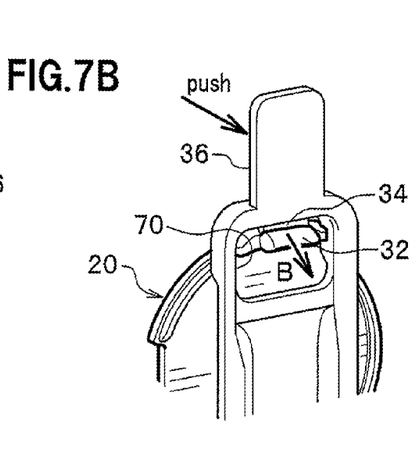

Subsequently, as the hook cover holding mechanism 26 inclines, the hold latch nail 34 is also displaced rearward so as to push the cover snap-fit claw 32 of the hook cover 20 obliquely downward and rearward (the direction of arrow B), and thereby the engagement between the cover snap-fit claw 32 and the hold latch nail 34 is released (refer to FIG. 7B). As the engagement of the hold latch nail 34 is released, the resilient force of the cover resilient portion 52, which has been suppressed so far, is released outwardly of the bumper opening section 14, and the cover body section 40 is separated (displaced) from the hook cover holding mechanism 26 (hold bulge portion 68).

Figure 7C:
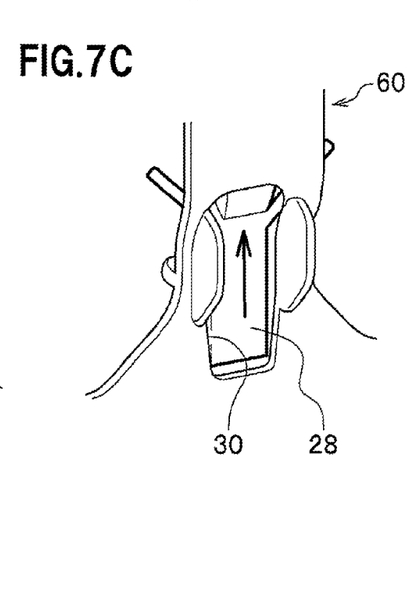
Figure 7D:
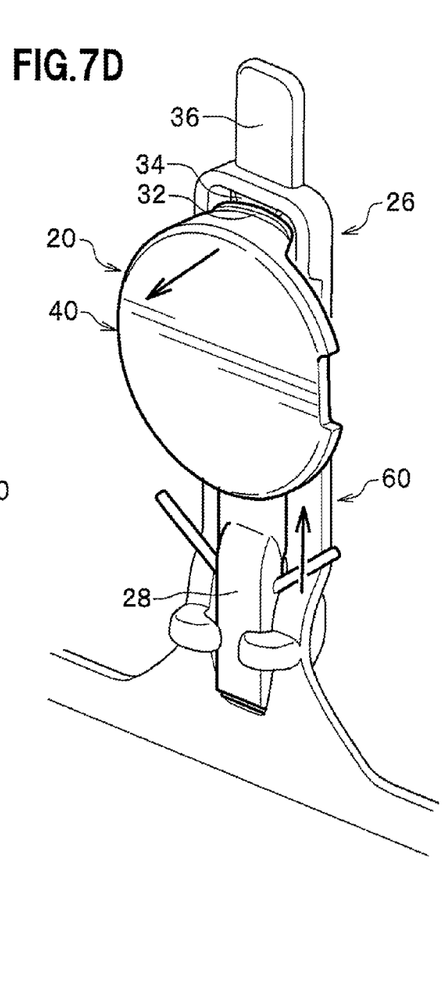

The frontward displacement of the cover body section 40 makes it easy for the operator to grab the hook cover 20 in order to readily pull out (disengage) the hook cover 20 upwardly from the hook cover holding mechanism 26 without using tools or the like (refer to FIGS. 7C and 7D).

Figure 8A:
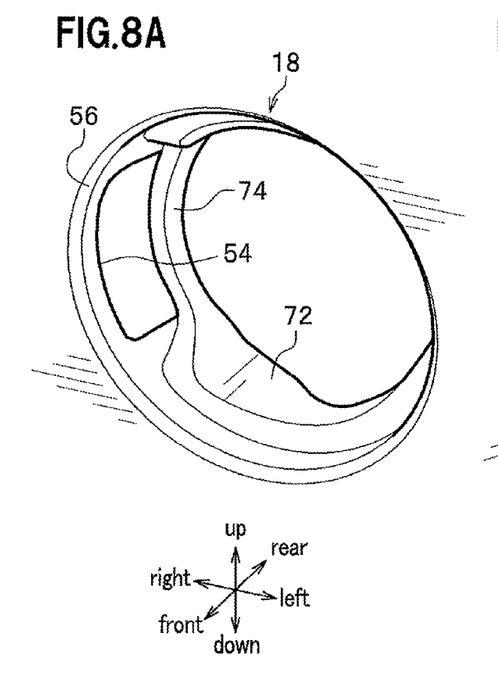
FIG. 8A is a perspective view of a hook cover attachment portion of the bumper face as seen from frontward.
Figure 8B:
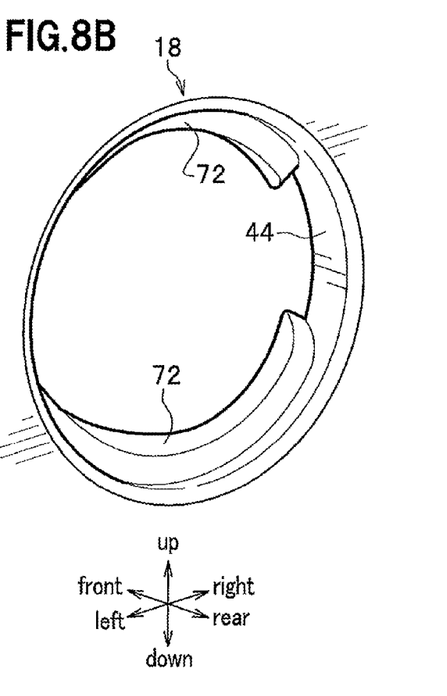
FIGS. 8B and 8C are perspective views of the hook cover attachment portion of the bumper face as seen from rearward.
Figure 8C:
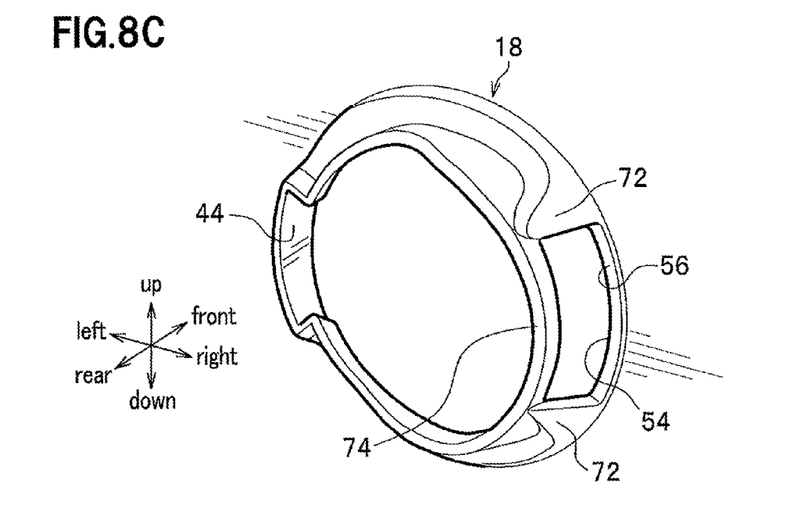
Figure 9A:
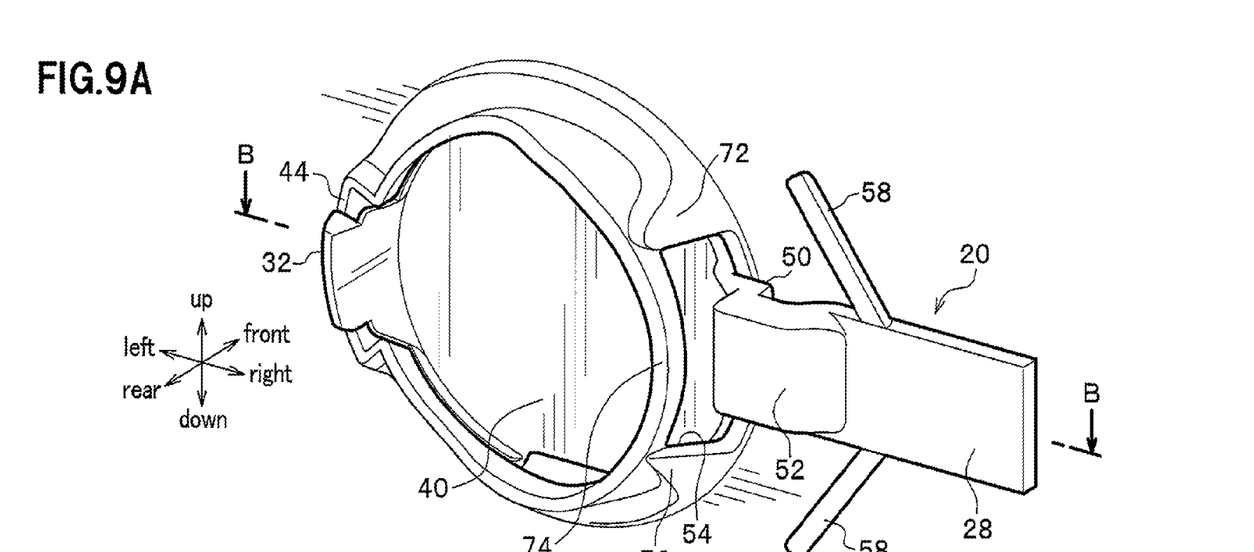
FIG. 9A is a partially enlarged perspective view of a state where the hook cover is attached to the hook cover attachment portion.

FIG. 8A is a perspective view of the hook cover attachment portion of the bumper face as seen from frontward, and FIGS. 8B and 8C are perspective views of the hook cover attachment portion of the bumper face as seen from rearward. FIG. 9A is a partially enlarged perspective view of a state where the hook cover is attached to the hook cover attachment portion, and FIG. 9B is a lateral cross-sectional view taken along line B-B of FIG. 9A.

The hook cover attachment portion 18 is positioned at an outer end of the bumper face 12 (refer to FIG. 2), and the substantially circular through hole 38 (hook hole) is formed so as to extend therethrough in the front-rear direction of the vehicle 10.

The hook cover attachment portion 18 includes: a cover support wall 72 which is a wall portion formed along the substantially circular opening to support an outer circumferential surface of the hook cover 20; the bumper engaging portion 44 which engages with and support the cover snap-fit claw 32 formed in the hook cover 20; and the cover insertion opening 54 which is arranged face to face with the bumper engaging portion 44 at a circumferentially opposite position and through which the cover shaft section 28 is inserted. Further, the hook cover attachment portion 18 includes: the bumper step portion 56 which is formed at a part of the inner periphery of the cover insertion opening 54 to contact with and support the cover support portion 50; and a bumper restriction portion 74 which restricts a displacement of the cover shaft section 28 of the hook cover 20 inserted in the cover insertion opening 54 in the direction away from the bumper face 12.

Figure 9B:
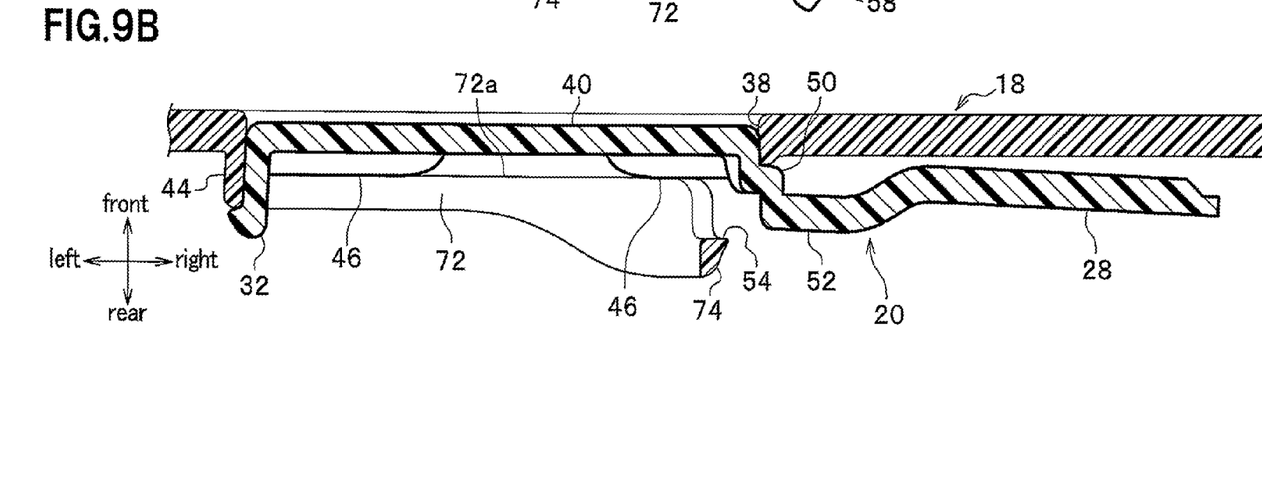
FIG. 9B is a lateral cross-sectional view taken along line B-B of FIG. 9A.

In this case, as shown in FIG. 9B, when the hook cover 20 is attached on the hook cover attachment portion 18 to close the through hole 38, the cover step portion 46 of the hook cover 20 is in contact with an inner wall 72a of the bumper support wall 72, so that a certain difference in level is secured between the bumper exterior surface and the exterior surface of the cover body section 40.

Figures 10A, 10B:
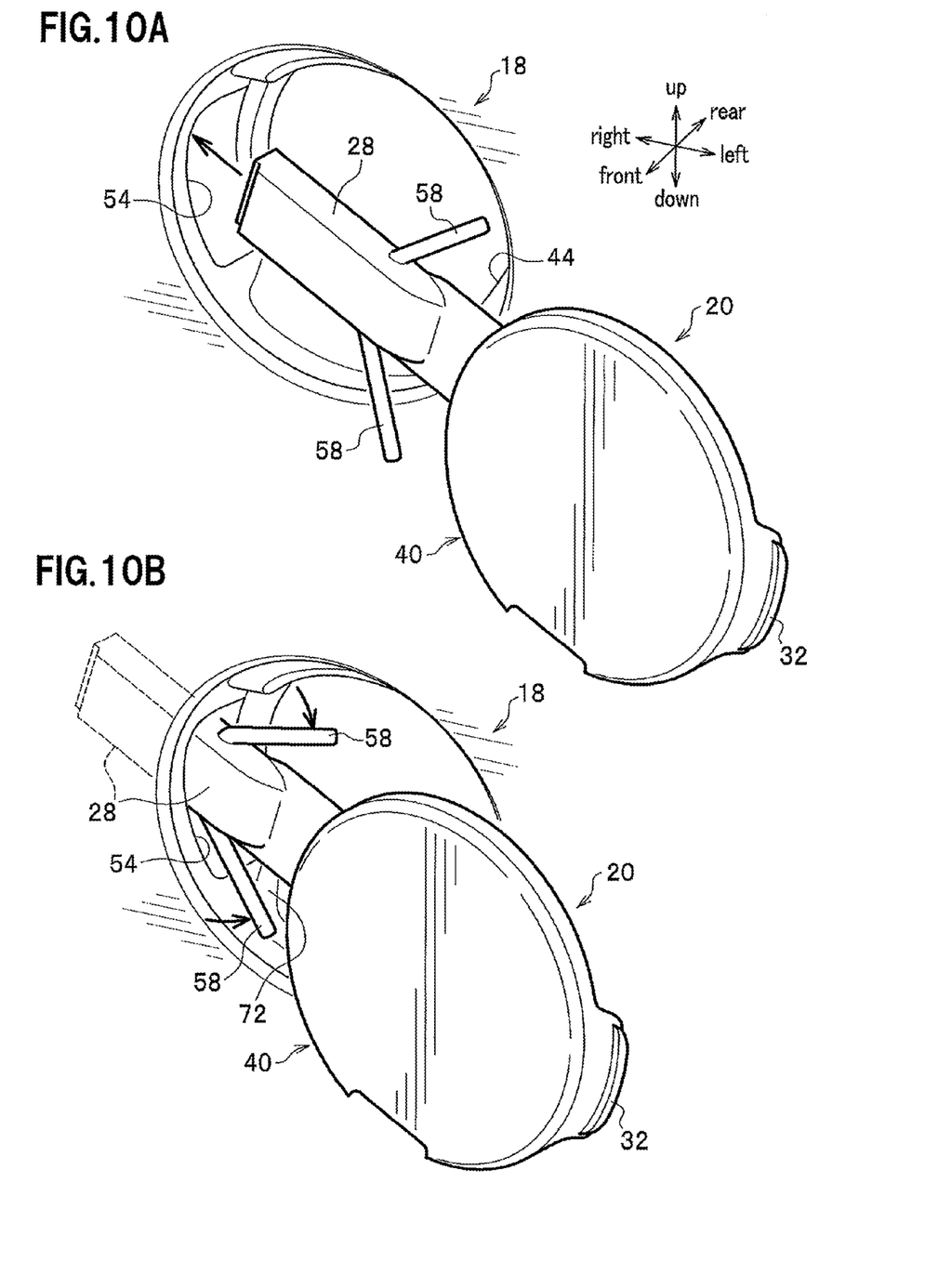
FIGS. 10A and 10B are enlarged perspective views illustrating states where the hook cover is attached to the hook cover attachment portion.

FIGS. 10A and 10B are an enlarged perspective view illustrating states where the hook cover is attached to the hook cover attachment portion. As shown in FIG. 10A, the operator inserts, from frontward of the bumper face 12, the cover shaft section 28 of the hook cover 20 into the cover insertion opening 54 in the arrow direction. On this occasion, the two cover restriction portions 58 protruding outward from the cover shaft section 28 deform resiliently in the arrow direction toward the cover shaft section 28 as shown in FIG. 10B, so as to smoothly insert the cover shaft section 28 into the cover insertion opening 54.

After the cover shaft section 28 is inserted in the cover insertion opening 54, the cover body section 40 is pushed along the circular opening, in order to bring the hook cover 20 in contact with the cover support wall 72, and also to engage the cover snap-fit claw 32 with the bumper engaging portion 44, so that the hook cover 20 is attached on the hook cover attachment portion 18.

Figure 11A:
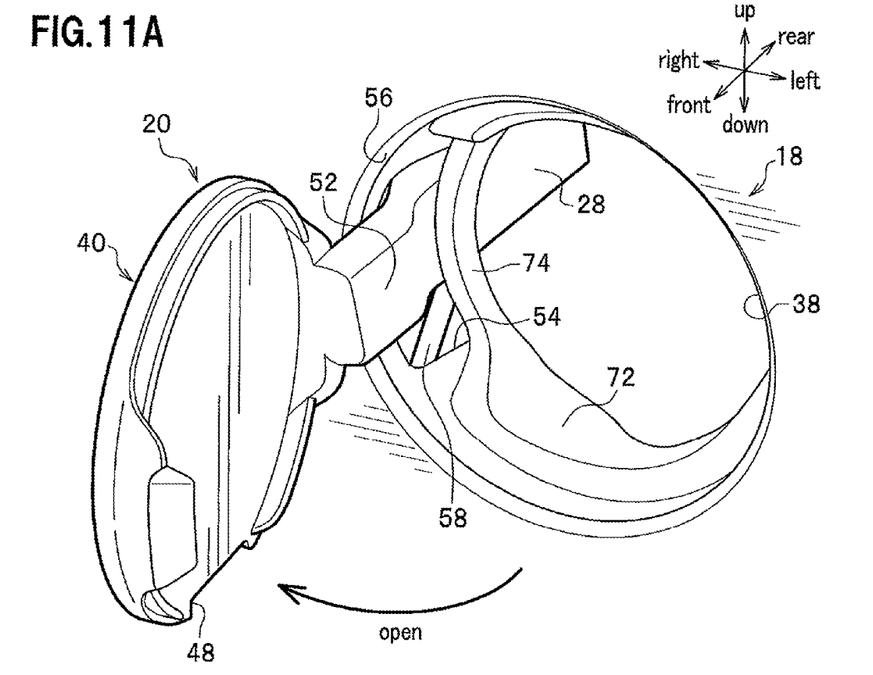
FIGS. 11A and 11B are enlarged perspective views illustrating states where the hook cover is opened from the hook cover attachment portion.
Figure 11B:
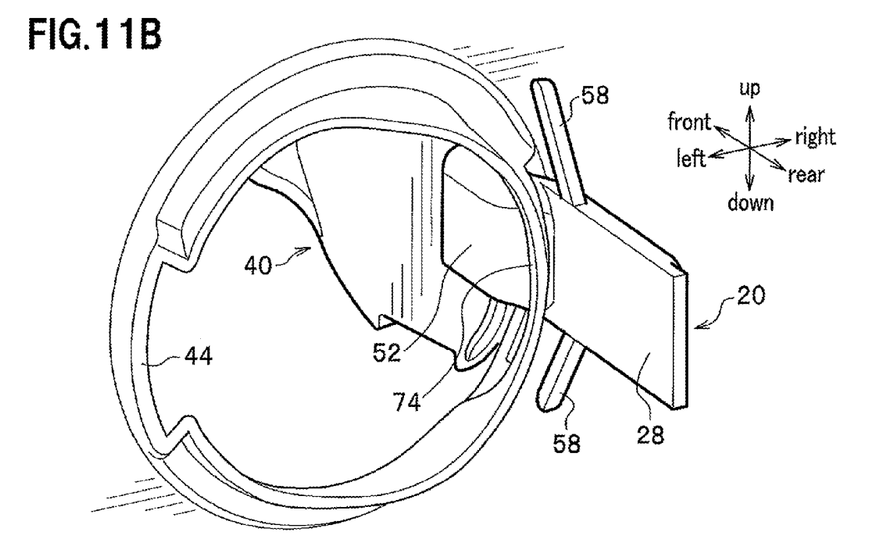

FIGS. 11A and 11B are enlarged perspective views illustrating states where the hook cover is opened from the hook cover attachment portion. FIG. 11A is a view of the bumper face as seen from frontward, and FIG. 11B is a view of the bumper face as seen from backward.

The operator inserts a tip of a tool such as, for example, a flat-blade screwdriver into the open recess 48 formed at a lower portion of the hook cover 20 in order to pull out the cover body section 40 frontward, and thereby the hook cover 20 is opened outwardly of the vehicle (refer to FIG. 11A). In this case, since the cover insertion opening 54 is formed with a certain width along the front-rear direction of the vehicle 10, the cover body section 40 pivots in the arrow direction about the bumper step portion 56 as a pivot point. The cover body section 40 is openable up to a position where the cover resilient portion 52 contacts with the bumper restriction portion 74 adjacent to the cover resilient portion 52 of the cover shaft section 28 (refer to FIG. 11B).

Also, since the cover restriction portions 58 is supported resiliently by the back side (rear side) of the bumper face 12 (refer to FIG. 11B), the hook cover 20 is prevented from dropping off the bumper face 12 even in use of a tow hook not shown.

The vehicle front structure according to the present embodiment is applied to the vehicle 10 that is basically structured as described above. Next, its behavior and effect will be described.

In the present embodiment, after the bumper face 12, the hook cover 20 and the hook cover holding mechanism 26 are formed integrally by injection molding with a plastic material for example, the hook cover 20 is separated from the bumper face 12, and the cover snap-fit claw 32 is engaged with and supported by the hold latch nail 34 of the hook cover holding mechanism 26 by the resilient deformation of the hook cover 20.

In this way, in the present embodiment, when coating the bumper face 12 and the hook cover 20 simultaneously, the hook cover holding mechanism 26 suppresses the vibration and displacement of the hook cover 20 and performs the function as a tool for support and fixation. As a result, in the present embodiment, the mottle and the too-thin coating are prevented from occurring at the time of coating.

In addition, in the present embodiment, the separation of the hook cover 20 from the bumper face 12 at the time of manufacturing makes it possible to manage them as separate components, and manufacturing both the bumper face 12 and the hook cover 20 is not always necessary in the manufacturing of maintenance components, which results in reduced manufacturing cost.

Further, in the present embodiment, since the hook cover 20 is transported and washed with high pressure in a state supported and fixed by the hook cover holding mechanism 26, the hook cover 20 is prevented from being disengaged from the bumper face 12 by a wind pressure of passing wind during transportation or a water pressure of washing liquid during high pressure washing.

Furthermore, in the present embodiment, since the bumper face 12 and the hook cover 20 are assembled integrally via the hook cover holding mechanism 26 and are transported in a supported and fixed state, the packaging cost and transportation cost are cut back to reduce the manufacturing cost.

Furthermore, in the present embodiment, the cover shaft section 28 of the hook cover 20 separated from the bumper face 12 is inserted into the first hold opening section 30 to make the cover snap-fit claw 32 securely engaged with and supported by the hold latch nail 34 by the resilient deformation of the cover resilient portion 52.

Furthermore, in the present embodiment, the hook cover 20 is securely held by the engagement of the cover shaft section 28 of the hook cover 20 with the hold leg portions 64, and thereby the hook cover 20 is preferably prevented from disengaging by the vibration and the displacement of the hook cover 20 at the time of coating, the wind pressure at the time of transporting, or the water pressure at the time of high pressure washing.

Furthermore, in the present embodiment, the engagement between the cover snap-fit claw 32 and the hold latch nail 34 is readily released by pushing the hold manipulation portion 36 inwardly of the bumper face 12. On the other hand, another tool for detaching the hook cover 20 from the hook cover holding mechanism 26 becomes unnecessary to enhance workability therein.

Furthermore, in the present embodiment, the cover holding nails 62 and the hold reinforcement portions 66 are provided to enhance the function for supporting and fixing the cover shaft section 28 of the hook cover 20 in order to obtain a stably supported and fixed state.

Furthermore, in the present embodiment, attaching work is conducted after the bumper face 12 is attached on the front end of the vehicle 10, and before the license plate is attached on the license plate mounting portion 22. In this case, since the hook cover holding mechanism 26 is arranged within the license plate opening section 24 which is visible from the outside of the vehicle 10, the hook cover 20 is readily detachable from the hook cover holding mechanism 26 without detaching the bumper face 12 or the lower grill 16 and, what is more, without using another tool or the like.

Furthermore, in the present embodiment, the cover shaft section 28 of the hook cover 20 is provided with the resilient cover restriction portions 58, which resiliently support the back side of the bumper face 12 when the hook cover 20 is opened from the hook cover attachment portion 18 outwardly of the vehicle 10. As a result, in the present embodiment, the hook cover 20 is prevented from dropping off the bumper face 12 even in use of tow hook not shown. Also, the exterior surface of the bumper face 12 is avoided from being damaged even when the hook cover 20 is pivoted to open.

DESCRIPTION OF REFERENCE SYMBOLS

10: a vehicle
12: a bumper face
14: a bumper opening section
16: a lower grill (bumper component)
18: a hook cover attachment portion
20: a hook cover
22: a license plate mounting portion
24: a license plate opening section
26: a hook cover holding mechanism
28: a cover shaft section
30: a first hold opening section
32: a cover snap-fit claw
34: a hold latch nail
36: a hold manipulation portion
38: a through hole
40: a cover body section
44: a bumper engaging portion
46: a cover step portion
50: a cover support portion
52: a cover resilient portion
54: a cover insertion opening
56: a bumper step portion
58: a cover restriction portion
62: a cover holding nail
64: a hold leg portion
66: a hold reinforcement portion
70: a second hold opening section

What is claimed is:

1. A structure for a front portion of a vehicle, comprising:
a bumper face disposed at a front end of the vehicle; and
a bumper component disposed at a bumper opening section of the bumper face,
wherein the bumper face comprises:
a hook cover, after formed integrally with the bumper face within the bumper opening section, separated from the bumper face; and
a hook cover holding mechanism formed within the bumper opening section integrally with the bumper face to detachably support and fix the hook cover,
wherein the hook cover comprises:
a cover body section for closing a hook cover attachment portion disposed in the bumper face; and
a cover snap-fit claw for snap-fitting onto a bumper engaging portion disposed in the hook cover attachment portion, wherein the hook cover holding mechanism comprises a hold latch nail for engaging with and supporting the cover snap-fit claw by resilient deformation of the hook cover.

2. The structure for the front portion of the vehicle according to claim 1,
wherein the hook cover further comprising:
a cover shaft section extending outward from the cover body section; and
a cover resilient portion disposed between the cover body section and the cover shaft section,
wherein the hook cover holding mechanism further comprises:
a first hold opening section for receiving the cover shaft section inserted therein when supporting and fixing the hook cover; and
a second hold opening section for receiving the cover snap-fit claw inserted therein, the second hold opening section including the hold latch nail.

3. The structure for the front portion of the vehicle according to claim 2,
wherein the hook cover holding mechanism further comprises:
a hold leg portion disposed at the first hold opening section on left and right sides thereof, and connected to a periphery of the bumper opening section; and
a hold manipulation portion extending from a vicinity of the second hold opening section toward a middle of the bumper opening section,
wherein the hold manipulation portion is pushed inwardly of the bumper face to disengage the cover snap-fit claw.

4. The structure for the front portion of the vehicle according to claim 3, wherein
the hold leg portion comprises:
a cover holding nail disposed on an outside with respect to the bumper face; and
a hold reinforcement portion disposed on an inside with respect to the bumper face.

5. The structure for the front portion of the vehicle according to claim 1,
wherein the bumper component comprises:
a license plate mounting portion for mounting a license plate; and
a license plate opening section formed in the license plate mounting portion,
wherein the hook cover holding mechanism is arranged within the license plate opening section.

6. The structure for the front portion of the vehicle according to claim 2,
wherein the cover shaft section comprises cover restriction portions extending outwardly from middles of left and right sides of the cover shaft section toward the cover body section,
wherein the hook cover attachment portion has a cover insertion opening, formed at an outer end of the bumper face, for receiving the cover shaft section inserted therein,
wherein the cover restriction portion resiliently deforms toward the cover shaft section during insertion of the cover shaft section into the cover insertion opening, and the cover restriction portion resiliently supports the bumper face on a back side thereof at the time when the hook cover is opened outwardly of the vehicle.

7. A method for manufacturing a vehicle comprising the structure for the front portion of the vehicle according to claim 3, comprising the steps of:
forming integrally the bumper face, the hook cover and the hook cover holding mechanism;
separating the hook cover from the bumper face;
inserting the cover shaft section of the hook cover into the first hold opening section, and fixing by engagement the cover snap-fit claw onto the hold latch nail;
pushing the hold manipulation portion inwardly of the bumper face to disengage the cover snap-fit claw, and pulling out the hook cover upwardly from the first hold opening section; and
attaching the hook cover onto the hook cover attachment portion.

8. The structure for the front portion of the vehicle according to claim 2,
wherein the bumper component comprises:
a license plate mounting portion for mounting a license plate; and
a license plate opening section formed in the license plate mounting portion,
wherein the hook cover holding mechanism is arranged within the license plate opening section.

9. The structure for the front portion of the vehicle according to claim 3,
wherein the bumper component comprises:
a license plate mounting portion for mounting a license plate; and
a license plate opening section formed in the license plate mounting portion,
wherein the hook cover holding mechanism is arranged within the license plate opening section.

10. The structure for the front portion of the vehicle according to claim 4,
wherein the bumper component comprises:
a license plate mounting portion for mounting a license plate; and
a license plate opening section formed in the license plate mounting portion, wherein the hook cover holding mechanism is arranged within the license plate opening section.

* * * * *